United States Patent
Liu et al.

(10) Patent No.: US 12,126,951 B2
(45) Date of Patent: Oct. 22, 2024

(54) WIRELESS MICROPHONE DEVICE AND USE METHOD THEREFOR

(71) Applicant: APUTURE IMAGING INDUSTRIES CO., LTD., Guangdong (CN)

(72) Inventors: Fuping Liu, Guangdong (CN); Xiangjun Zhou, Guangdong (CN)

(73) Assignee: APUTURE IMAGING INDUSTRIES CO., LTD., Guangdong (CN)

( * ) Notice: Subject to any disclaimer, the term of this patent is extended or adjusted under 35 U.S.C. 154(b) by 192 days.

(21) Appl. No.: 17/915,162

(22) PCT Filed: Oct. 9, 2020

(86) PCT No.: PCT/CN2020/119941
§ 371 (c)(1),
(2) Date: Sep. 28, 2022

(87) PCT Pub. No.: WO2021/203647
PCT Pub. Date: Oct. 14, 2021

(65) Prior Publication Data
US 2023/0079300 A1   Mar. 16, 2023

(30) Foreign Application Priority Data
Apr. 10, 2020   (CN) .......................... 202010278632.X

(51) Int. Cl.
*H04R 1/08*     (2006.01)
*H04L 67/133*   (2022.01)
*H04W 56/00*    (2009.01)

(52) U.S. Cl.
CPC ............. *H04R 1/08* (2013.01); *H04L 67/133* (2022.05); *H04W 56/00* (2013.01); *H04R 2420/07* (2013.01)

(58) Field of Classification Search
CPC ...... H04R 1/08; H04R 2420/07; H04W 56/00
(Continued)

(56) References Cited

U.S. PATENT DOCUMENTS

| 8,332,058 B2 | 12/2012 | Buhe et al. |
| 9,094,636 B1 | 7/2015 | Anders et al. |

(Continued)

FOREIGN PATENT DOCUMENTS

| CN | 101009492 A | 8/2007 |
| CN | 102196327 A | 9/2011 |

(Continued)

OTHER PUBLICATIONS

International Search Report and the Written Opinion Dated Jan. 4, 2021 From the International Searching Authority Re. Application No. PCT/CN2020/119941 and Its Translation of Search Report Into English (3 Pages).

(Continued)

*Primary Examiner* — Thjuan K Addy
(74) *Attorney, Agent, or Firm* — Rivka Friedman

(57) ABSTRACT

The present invention belongs to the technical field of audio equipment, and particularly relates to a wireless microphone device and a use method therefor. In the wireless microphone device, a main control unit controls a transmitter working mode in which an input unit, an output unit, a time code unit, a conversion modulation unit, a storage unit and a radio-frequency unit work together; or a receiver working mode in which the input unit, the output unit, the time code unit, the conversion modulation unit and the radio frequency unit work together; or a time code generator working mode in which the output unit and the time code unit work together; or a sound recorder working mode in which the input unit, the time code unit, the conversion modulation unit and the storage unit work together.

17 Claims, 2 Drawing Sheets

(58) Field of Classification Search
USPC .............. 381/122, 111, 56, 57, 58, 91, 95
See application file for complete search history.

(56) References Cited

U.S. PATENT DOCUMENTS

| | | | |
|---|---|---|---|
| 10,276,207 B1 * | 4/2019 | Sanders | .............. G08C 25/02 |
| 10,448,157 B2 | 10/2019 | Bryant et al. | |
| 2010/0119099 A1 | 5/2010 | Haupt et al. | |
| 2014/0180684 A1 | 6/2014 | Strub | |

FOREIGN PATENT DOCUMENTS

| | | |
|---|---|---|
| CN | 102395063 A | 3/2012 |
| CN | 105551224 A | 5/2016 |
| CN | 205754609 U | 11/2016 |
| CN | 205921714 U | 2/2017 |
| CN | 206302530 U | 7/2017 |
| CN | 108337586 A | 7/2018 |
| CN | 207720356 U | 8/2018 |
| CN | 110730398 A | 1/2020 |
| CN | 110958484 A | 4/2020 |
| CN | 111586510 A | 8/2020 |
| WO | 2007028628 A1 | 3/2007 |

OTHER PUBLICATIONS

The First Office Action and Search Report Dated Apr. 21, 2021, for Aputure Imaging Industries Co., Ltd., from China Application No. 202010278632.X and Its Translation of Office Action Into English (4 pages).

* cited by examiner

WIRELESS MICROPHONE DEVICE AND USE METHOD THEREFOR

BACKGROUND

Field of Invention

The present invention relates to a technology field of audio equipment, and in particular, to a wireless microphone device and use method therefor.

Description of Prior Art

Wireless microphone devices are gaining popularity due to them getting rid of being tied to wired cables. At present, there are also many kinds of wireless microphone devices on the market. According to different transmission frequencies, there are VHF wireless microphones, UHF wireless microphones, 2.4G microphones, etc. According to different debugging methods, there are also analog microphones and digital microphones. Similarly, the wireless microphone devices are used more and more widely, such as for meetings, video shooting, interviews, etc. However, functions of the wireless microphone devices on the market are relatively simple, and using modes are not flexible enough. It is not very convenient for people to use the wireless microphone devices. For example, for some interviews, it is often necessary to prepare an additional recorder to record interview content. Another example is video production. After video shooting, there is a problem that video and audio are not synchronized, which requires manual processing to synchronize times of video and audio, or to prepare a special time synchronization tool, etc.

SUMMARY

The present invention aims to provide a wireless microphone device and use method therefor, aiming to solve a problem that functions of the wireless microphone device in prior art are relatively simple and using modes are not flexible enough.

To achieve the above purpose, a technical solution adopted by the present invention is: a wireless microphone device, comprising: an input unit, the input unit configured to receive a first external audio signal or a first external time code; a time code unit, the time code unit configured to generate a local time code or configured to synchronize a generated local time code with the first external time code; a conversion modulation unit, the conversion modulation unit configured to convert and modulate the first external audio signal; a radio frequency unit, the radio frequency unit configured as a transmitter to transmit the first external audio signal converted and modulated by the conversion modulation unit or the local time code generated by the time code unit; or the radio frequency unit configured as a receiver to receive a second external audio signal or a second external time code, wherein the conversion modulation unit is configured to convert and modulate the second external audio signal, and the time code unit is configured to synchronize the generated local time code with the second external time code; a storage unit configured to store the first external audio signal converted and modulated by the conversion modulation unit or configured to store the second external audio signal converted and modulated by the conversion modulation unit; an output unit configured to output the local time code generated by the time code unit, or configured to output the first external audio signal converted and modulated by the conversion modulation unit, or configured to output the second external audio signal converted and modulated by the conversion modulation unit, or configured to output a local audio signal stored in the storage unit and converted and modulated by the conversion modulation unit; a main control unit electrically connected with the input unit, the output unit, the time code unit, the conversion modulation unit, the storage unit, and the radio frequency unit; wherein the main control unit is configured to control at least two of the input unit, the output unit, the time code unit, the conversion modulation unit, the storage unit, and the radio frequency unit to work together according to received instructions to form a plurality of different working modes.

Further, before the wireless microphone device is powered off, the main control unit is configured to acquire and save a current working mode, and when the wireless microphone device is powered on next time, the main control unit is configured to acquire the current working mode before power off as a default working mode after power on.

Further, the main control unit controls the input unit to work and input the first external audio signal, and the main control unit controls the time code unit to generate the local time code or synchronize the generated local time code with the first external time code; the main control unit controls the conversion modulation unit to work together with the storage unit, and the radio frequency unit is configured as the transmitter, the radio frequency unit is provided with a first connection protocol and a second connection protocol; when the main control unit controls the radio frequency unit to call the first connection protocol, the wireless microphone device enters a standard transmitter working mode, when the main control unit controls the radio frequency unit to call the second connection protocol, the wireless microphone device enters a special transmitter working mode.

Further, the second connection protocol comprises a sub-connection protocol one and a sub-connection protocol two, a number of connectable external receivers set in the sub-connection protocol one is only one, and a number of the connectable external receivers set in the sub-connection protocol two is two to four, when the main control unit calls the sub-connection protocol one, the wireless microphone device is in a first special transmitter working mode, and when the main control unit calls the sub-connection protocol two, the wireless microphone device is in a second special transmitter working mode.

Further, when the wireless microphone device enters the second special transmitter working mode, a number of the connectable external receivers of the wireless microphone device is four.

Further, the main control unit controls the input unit to work and input only the first external time code or controls the input unit does not work; the main control unit controls the output unit to output the second external audio signal converted and modulated by the conversion modulation unit; the main control unit controls the conversion modulation unit to work together with the time code unit, the radio frequency unit is configured as the receiver, and the radio frequency unit is provided with a first connection protocol and a second connection protocol; when the main control unit controls the radio frequency unit to call the first connection protocol, the wireless microphone device enters a standard receiver working mode, wherein when the first external time code is input by the input unit, the main control unit controls the time code unit to work and synchronize the generated local time code with the first external time code; when the radio frequency unit receives the second external time code, the main control unit controls the time code unit to work and synchronize the generated local time code with the second external time code; when the input unit does not input the first external time code and the radio frequency unit does not receive the second external time code, the main control unit controls the time code unit to generate the local time code; when the main control unit controls the radio frequency unit to call the second connection protocol, the wireless microphone device enters a special receiver working mode.

Further, the time code unit is provided with a first calling protocol, when the main control unit controls the time code unit to call the first calling protocol, the wireless microphone device enters a special receiver working mode one, and the main control unit controls the time code unit to generate the local time code.

Further, the time code unit is further provided with a second calling protocol, when the main control unit controls the time code unit to call the second calling protocol, the wireless microphone device enters a special receiver working mode two, wherein when the input unit is inputted the first external time code, the main control unit controls the time code unit to work and synchronize the generated local time code with the first external time code; when the radio frequency unit receives the second external time code, the main control unit controls the time code unit to work and synchronize the generated local time code with the second external time code; when the input unit is not inputted the first external time code and the radio frequency unit does not receive the second external time code, the main control unit controls the time code unit to generate the local time code.

Further, the main control unit is configured to control the time code unit to generate the local time code, and then to control the output unit to output the local time code; the input unit, the conversion modulation unit, the storage unit, and the radio frequency unit do not work, and the wireless microphone device enters a time code generator working mode; or the main control unit is configured to control the input unit to work and input the first external audio signal, the main control unit is configured to control the conversion modulation unit to convert and modulate the first external audio signal, the main control unit is configured to control the time code unit to generate the local time code, and the main control unit is configured to control the storage unit to store the first external audio signal converted and modulated by the conversion modulation unit, and neither the output unit nor the radio frequency unit operates, and the wireless microphone device enters a sound recorder working mode.

According to another aspect of the present invention, a method for using a wireless microphone device is provided. Specifically, the method for using the wireless microphone device is based on an interconnection of at least two wireless microphone devices; wherein the wireless microphone device comprising: an input unit, the input unit configured to receive a first external audio signal or a first external time code; a time code unit, the time code unit configured to generate a local time code or configured to synchronize a generated local time code with the first external time code; a conversion modulation unit, the conversion modulation unit configured to convert and modulate the first external audio signal; a radio frequency unit, the radio frequency unit configured as a transmitter to transmit the first external audio signal converted and modulated by the conversion modulation unit or the local time code generated by the time code unit; or the radio frequency unit configured as a receiver to receive a second external audio signal or a second external time code, wherein the conversion modulation unit is configured to convert and modulate the second external audio signal, and the time code unit is configured to synchronize the generated local time code with the second external time code; a storage unit configured to store the first external audio signal converted and modulated by the conversion modulation unit or configured to store the second external audio signal converted and modulated by the conversion modulation unit; an output unit configured to output the local time code generated by the time code unit, or configured to output the first external audio signal converted and modulated by the conversion modulation unit, or configured to output the second external audio signal converted and modulated by the conversion modulation unit, or configured to output a local audio signal stored in the storage unit and converted and modulated by the conversion modulation unit; a main control unit electrically connected with the input unit, the output unit, the time code unit, the conversion modulation unit, the storage unit, and the radio frequency unit; wherein the radio frequency unit is provided with a first connection protocol and a second connection protocol; the radio frequency unit of one of the at least two wireless microphone devices is configured as the transmitter and the radio frequency unit of at least one of the remaining at least two wireless microphone devices is configured as the receiver; when the main control unit of the wireless microphone device configured as the transmitter controls the radio frequency unit to call the first connection protocol, the main control unit of the wireless microphone device configured as a receiver controls the radio frequency unit to call the second connection protocol; or when the main control unit of the wireless microphone device configured as the transmitter controls the radio frequency unit to call the second connection protocol, the main control unit of the wireless microphone device configured as the receiver controls the radio frequency unit to call the first connection protocol; after all wireless microphone devices are powered on and startup, the wireless microphone device configured as the transmitter is connected with the corresponding wireless microphone device configured as the receiver.

The present invention has at least the following beneficial effects:

The wireless microphone device provided by the present invention works in different working modes corresponding to different application scenarios, that is, the wireless microphone device is compatible with multiple working modes, which can not only meet requirements of one transmitter with one receiver, but also support requirements of one transmitter with multiple receivers. therefor, the wireless microphone device integrates the transmitter and the receiver; and the internal working modes of the wireless microphone device are diverse, and the using methods and occasions are flexible. At a same time, the wireless microphone device can also support recording and time code synchronization functions, which can meet usage requirements of more occasions and save manpower and material resources.

BRIEF DESCRIPTION OF DRAWINGS

In order to explain the technical solutions in the embodiments of the present invention more clearly, the following will briefly introduce the drawings needed in the description of the embodiments. Obviously, the drawings in the following description are only some embodiments of the present invention. For those skilled in the art, other drawings can be obtained based on these drawings without creative work.

Figure 1:
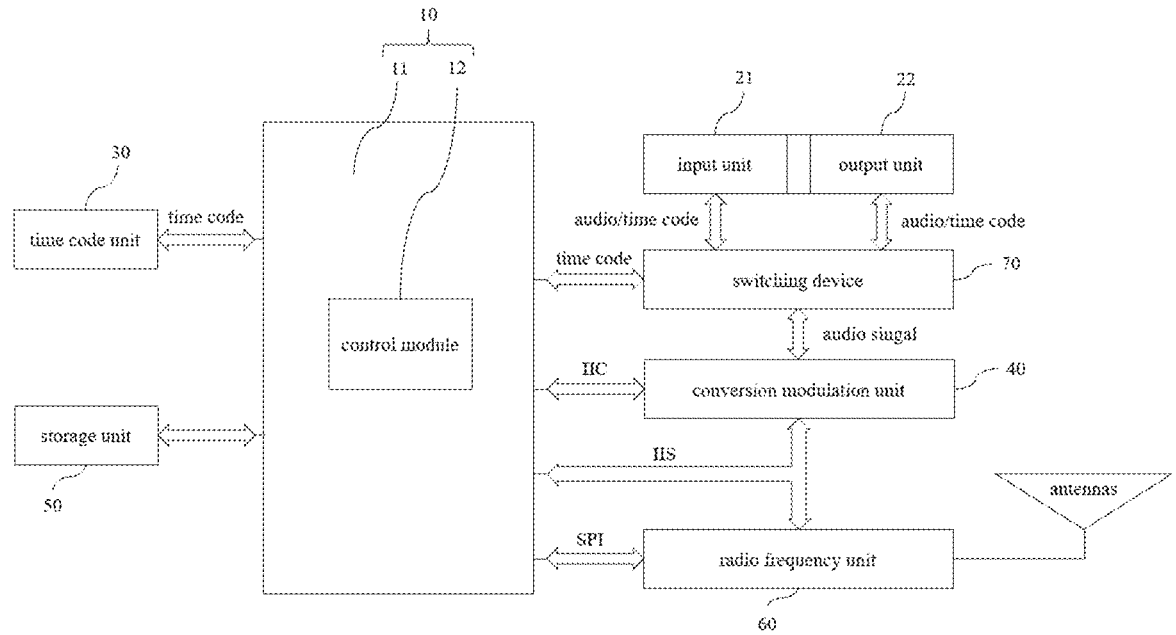
FIG. 1 is a structural block diagram of a design method of a wireless microphone device of the present invention.

Wherein, each of reference marks in the figures:

10. main control unit; 11. circuit board; 12. control module; 21. input unit; 22. Output unit; 30. time code unit; 31. real-time clock; 32. timer; 40. conversion modulation unit; 50. storage unit; 51. serial audio interface module; 52. data storage module; 60. radio frequency unit; 70. switching device.

DETAILED DESCRIPTION OF PREFERRED EMBODIMENTS

The embodiments of the present invention are described in detail below. The examples of the embodiments are shown in the drawings, in which same or similar labels throughout represent same or similar elements or elements with same or similar functions. The embodiments described below with reference to the accompanying drawings are exemplary and are intended to be used to explain the present invention, but cannot be understood as a limitation of the present invention.

In the description of the present invention, it should be understood that the orientation or positional relationship indicated by the terms "length", "width", "up", "down", "front", "back", "left", "right", "vertical", "horizontal", "top", "bottom", "inside", "outside", etc. is based on an orientation or a positional relationship shown in the attached drawings, only for the convenience of describing the present application and simplifying the description, rather than indicating or implying that the device or element referred to must have a specific orientation constructed and operated in a specific orientation, therefore, it cannot be understood as a restriction on the present invention.

In addition, the terms "first" and "second" are only used for descriptive purposes and can not be understood as indicating or implying relative importance or implicitly indicating the number of indicated technical features. Thus, the features defining "first" and "second" may explicitly or implicitly include one or more of the features. In the description of the present invention, "multiple" means two or more, unless otherwise specifically defined.

In the present invention, unless otherwise specified and defined, the terms "installation", "connection", "fixed" and other terms should be understood in a broad sense. For example, it can be fixed connection, removable connection, or integrated; it can be mechanical connection or electrical connection; it can be directly connected or indirectly connected through intermediate media; it can be internal connection of two components or interaction between two components. For ordinary technicians in the arts, the specific meaning of the above terms in the present invention can be understood according to specific situations.

Definition Explanation

A first external audio signal refers to any audio signal input through an input unit. The first external audio signal can realize data transmission in analog signal format, digital signal format, or radio frequency signal format.

A second external audio signal refers to any audio signal input through a radio frequency unit. The second external audio signal can realize data transmission in analog signal format, digital signal format, or radio frequency signal format.

A first external time code refers to a time code input through the input unit.

A second external time code refers to the time code received by the radio frequency unit.

Figure 2:
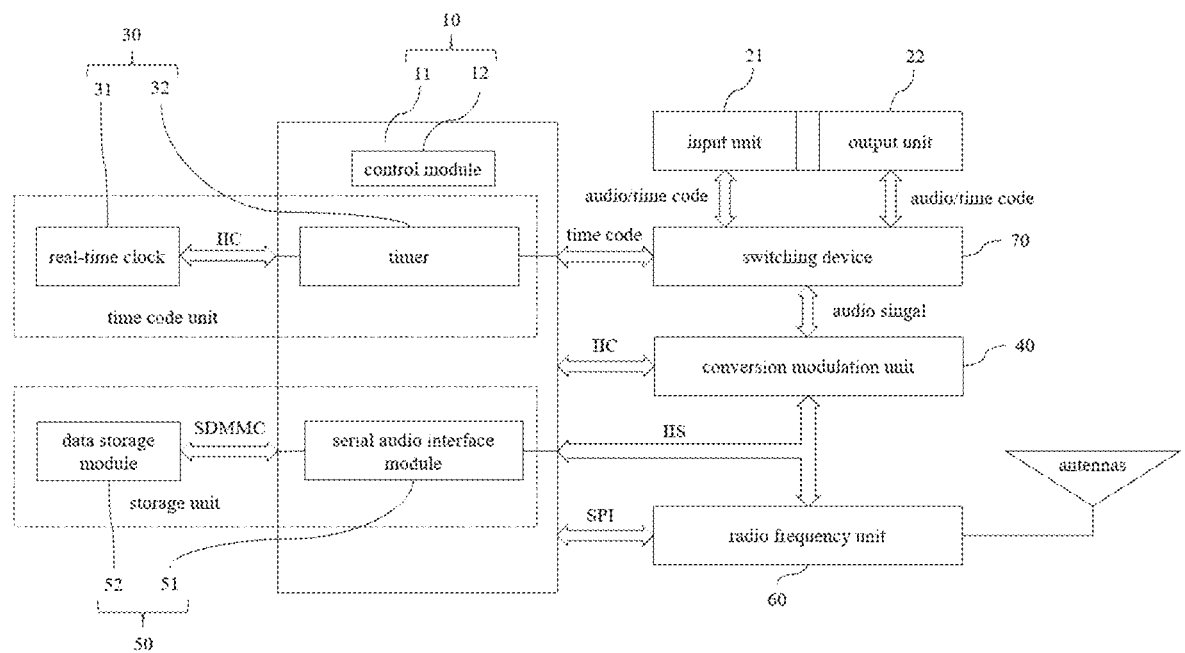
FIG. 2 is a structural block diagram of another design method of the wireless microphone device of the present invention.

As shown in FIG. 1 and FIG. 2, the present invention provides a wireless microphone device to achieve a purpose of compatible multi-function use, so as to adapt to more application scenarios and use more flexibly. The wireless microphone device comprises a main control unit 10, an input unit 21, an output unit 22, a time code unit 30, a conversion modulation unit 40, a storage unit 50, and a radio frequency unit 60. The assembly constitutes a portable wireless microphone device provided by the present invention, and user can conveniently carry the wireless microphone device by hand or wear it in a clothes pocket or at a waist. In the wireless microphone device, the input unit 21 is configured to receive a first external audio signal or a first external time code. The first external audio signal can be a audio signal collected through the input unit 21 (such as collected voice audio of user speaking), or the first external audio signal can be a audio signal of other devices and introduced through a headphone port of the input unit 21. The first external audio signal is an analog signal. The time code unit 30 is configured to generate a local time code (that is, a time code independently generated by the time code unit 30) or to synchronize a generated local time code with the first external time code (it can be a time code generated and sent by other special time code generators and input via the input unit 21, or it can be a time code that is processed and saved by other devices and input via the input unit 21). It can be understood that the time code can be a time code such as society of motion picture and television engineers (SMPTE), which comprises time code types such as hours, minutes, seconds, frames (i.e., non descending or descending frames), and user definable information (such as transmission status, scene name, shot name, etc.), such information makes it easier to match and/or combine audio signals with simultaneously recorded video or audio. The conversion modulation unit 40 is configured to convert and modulate the first external audio signal. The radio frequency unit 60 is configured as a transmitter to transmit the first external audio signal converted and modulated by the conversion modulation unit 40 or transmit the local time code generated by the time code unit 30; or the radio frequency unit 60 is configured as a receiver to receive a second external audio signal or a second external time code transmitted from outside (the radio frequency unit 60 transmits radio frequency signals, that is, the time code or the first external audio signal converted and modulated must be converted into radio frequency signals in the radio frequency unit 60 and then transmitted through antennas; in addition, the radio frequency unit 60 is also a received radio frequency signal, that is, the received radio frequency signal is converted into the second external audio signal or the time code in the radio frequency unit 60); and the conversion modulation unit 40 is configured to convert and modulate the second external audio signal, and the time code unit 30 is configured to synchronize the generated local time code with the second external time code. The output unit 22 is configured to output the local time code generated by the time code unit 30, or the output unit 22 is configured to rapidly output the first external audio signal converted and modulated by the conversion and modulation unit 40. At this time, the wireless microphone device has a real-time monitoring function; or the output unit 22 is configured to directly output the first external audio signal input by the input unit 21 (this is also a monitoring function); or the output unit 22 is configured to output the second external audio signal converted and modulated by the conversion modulation unit 40; or the output unit 22 is configured to output a local audio signal stored in the storage unit 50 and converted and modulated by the conversion and modulation unit 40 (the storage unit 50 can fix components that cannot be removed and replaced, or the storage unit 50 can be a component that can be inserted and pulled out for replacement, such as secure digital memory card (SD Memory Card) or the Micro SD card (TF card). In the present invention, the storage unit 50 is preferably in a design form of SD card or TF card. When different SD cards are replaced, audio datas stored in the SD card can be read for playback, that is, the local audio signals can be played, and the storage unit 50 can also be used as a mobile storage device to temporarily back up and store some materials, datas, etc. when necessary). The storage unit 50 is configured to store the first external audio signal converted and modulated by the conversion modulation unit 40; or the storage unit 50 is configured to store the second external audio signal converted and modulated by the conversion modulation unit 40.

In the wireless microphone device of the present invention, the conversion modulation unit 40 is composed of two parts: an analog to digital converter (ADC) module and an digital to analog converter (DAC) module. When the ADC module is working, the ADC module is responsible for converting analog signals into digital signals. When the DAC module is working, the DAC module is responsible for converting the digital signals to the analog signals.

The wireless microphone device of the present invention can be compatible with multiple working modes, and can switch among multiple working modes at will according to different application scenarios and usage requirements to meet usage requirements. The wireless microphone device comprises a transmitter working mode, a receiver working mode, a time code generator working mode, and a sound recorder working mode. Wherein the transmitter working mode comprises a standard transmitter working mode and a special transmitter working mode (a first special transmitter working mode and a second special transmitter working mode). The receiver working mode comprises a standard receiver working mode and a special receiver working mode (a special receiver working mode one and a special receiver working mode two).

When the main control unit 10 controls the input unit 21, the time code unit 30, the conversion modulation unit 40, the storage unit 50, and the radio frequency unit 60 to work together, and the radio frequency unit 60 is configured as a transmitter, the wireless microphone device enters the transmitter working mode. In the transmitter working mode, the input unit 21 receives the first external audio signal (at this time, the first external audio signal is the analog signal), and then the first external audio signal is transmitted to the conversion modulation unit 40, the conversion modulation unit 40 converts and modulates the first external audio signal into a digital signal through the ADC module, and stores the digital signal in the storage unit 50. At a same time, the radio frequency unit 60 continues to convert the first external audio signal obtained by conversion and modulation into a radio frequency signal for transmission through the antennas. At a same time, whether to synchronize the time code is selected as required. When the time code needs to be synchronized, the main control unit 10 calls a corresponding program running the time code unit 30 to realize a function of synchronizing the time code.

Alternatively, the main control unit 10 controls the input unit 21 to work and input only the first external time code or controls the input unit 21 does not work, the main control unit 10 controls the output unit 22 to output the second external audio signal converted and modulated by the conversion modulation unit 40, the main control unit 10 controls the conversion modulation unit 40 to work together with the time code unit 30, and the radio frequency unit 60 is configured as the receiver. At this time, the wireless microphone device enters the receiver working mode. In the receiver working mode, the radio frequency unit 60 receives the second external audio signal transmitted externally (at this time, the second external audio signal is in the radio frequency signal format). After receiving the second external audio signal in the radio frequency signal format, the radio frequency unit 60 immediately converts the second external audio signal into the digital signal format, and then the conversion modulation unit 40 converts and modulates the second external audio signal in the digital signal format into the analog signal format. Then the output unit 22 outputs the second external audio signal in the analog signal format obtained by conversion and modulation, and according to whether synchronization of the time code is required, when synchronization of the time code is required, the main control unit 10 calls the corresponding program running the time code unit 30 to realize the function of synchronization of the time code. If the second external audio signal after conversion and modulation needs to be stored, the storage unit 50 is called to store it.

Alternatively, the main control unit 10 controls a joint operation between the output unit 22 and the time code unit 30. At this time, the wireless microphone device is a simple time code generator, that is, the wireless microphone device enters the time code generator working mode.

Alternatively, the main control unit 10 controls the input unit 21, the time code unit 30, the conversion modulation unit 40, and the storage unit 50 to work together. At this time, the wireless microphone device is configured as a pure recorder, and at the time, the recorder has functions of receiving and synchronizing the time code, that is, the wireless microphone device enters the sound recorder working mode.

The wireless microphone device provided by the present invention works in different working modes corresponding to different application scenarios, that is, the wireless microphone device is compatible with multiple working modes, which can not only meet requirements of one transmitter with one receiver, but also support requirements of one transmitter with multiple receivers. Therefore, the wireless microphone device integrates the transmitter and the receiver. In addition, the internal working modes of the wireless microphone device are diverse, and the using modes and occasions are flexible. At a same time, the wireless microphone device can support recording and functions of receiving and synchronizing the time codes, which can meet usage requirements of more occasions and save manpower and material resources.

Figure 3:
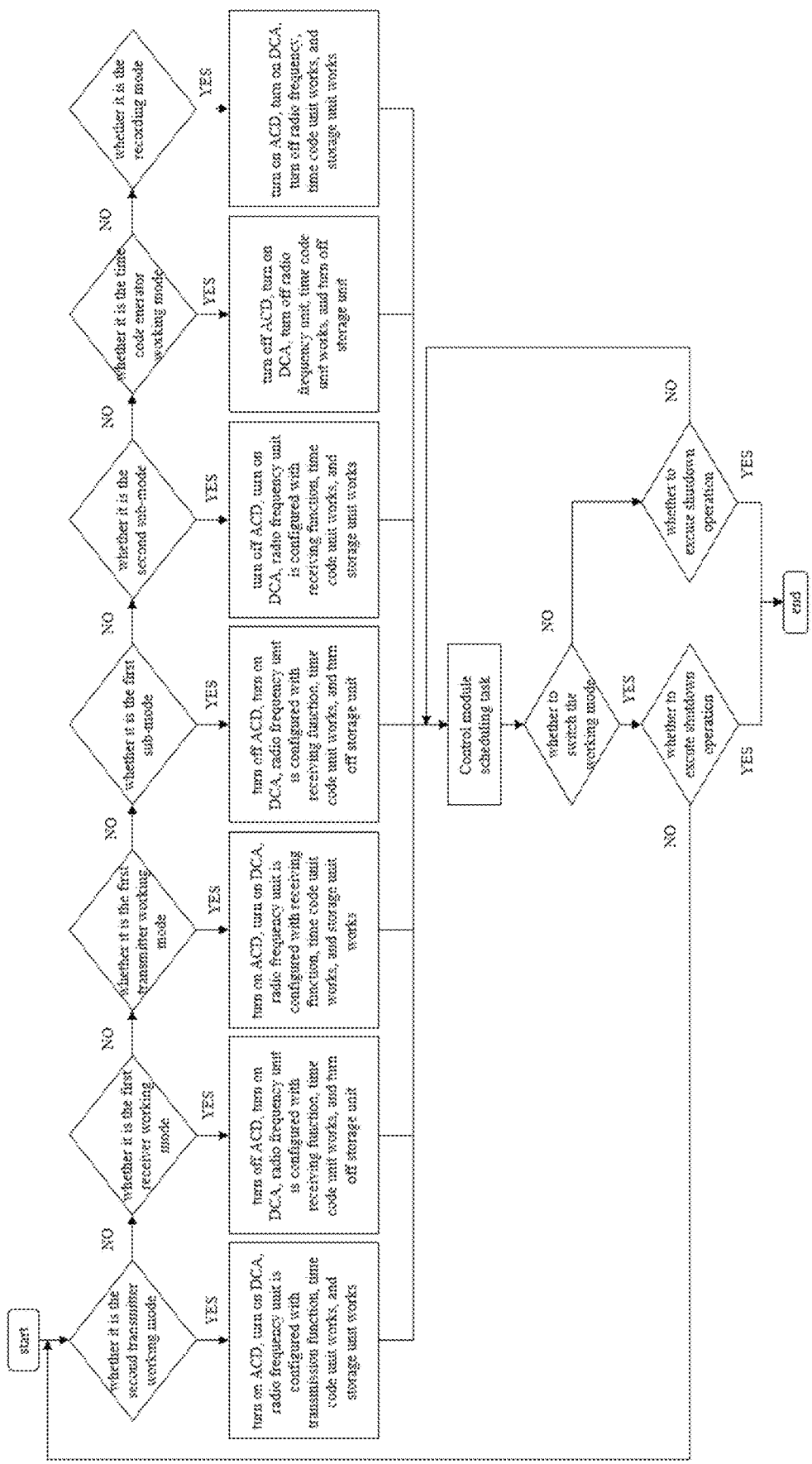
FIG. 3 is a working logic block diagram of the wireless microphone device of the present invention.

In the present invention, as shown in FIG. 3, the standard transmitter working mode is TX+REC mode, the first special transmitter working mode is unnamed, and the second special transmitter working mode is MASTER TX mode. The standard receiver working mode is RX MODE mode, the first special receiver working mode is IEM MODE mode, and the second special receiver working mode is CAMERA HOP mode. The time code generator working mode is TC BOX mode, and the sound recorder working mode is REC ONLY mode.

In the radio frequency unit 60 of the present invention, the radio frequency unit 60 is provided with a first connection protocol (slave protocol) and a second connection protocol (master protocol). When the radio frequency unit 60 is configured as the transmitter, if the radio frequency unit 60 calls the second connection protocol, a matched external receiver must be set as the first connection protocol; if the radio frequency unit 60 calls the first connection protocol, the matched external receiver must be set as the second connection protocol. Correspondingly, when the radio frequency unit 60 is configured as the receiver, if the radio frequency unit 60 calls the second connection protocol, the matched external transmitter must be set as the first connection protocol; if the radio frequency unit 60 calls the first connection protocol, the matched external transmitter must be set as the second connection protocol.

When the wireless microphone device provided by the present invention is in the transmitter working mode, when the main control unit 10 controls the radio frequency unit 60 to call the second connection protocol for operation, the wireless microphone device can connect two, three or four external receivers to form the MASTER TX mode. Preferably, in the present invention, when the main control unit 10 controls the radio frequency unit 60 to call the second connection protocol for operation, a maximum number of the external receivers that the radio frequency unit 60 can connect is four. When the main control unit 10 controls the radio frequency unit 60 to call the first connection protocol for operation, the wireless microphone device can only connect one external receiver to form the TX+REC mode. In another feasible scheme, in the transmitter working mode, the main control unit 10 controls the radio frequency unit 60 to only call the second connection protocol for operation. The second connection protocol comprises sub-connection protocol one and sub-connection protocol two. A number of connectable external receivers set in the sub-connection protocol one is one, and a number of the connectable external receivers set in the sub-connection protocol two is two, three or four, When the main control unit 10 controls the radio frequency unit 60 to call the sub-connection protocol two, the wireless microphone device is in MASTER TX mode. Preferably, a maximum number of the external receivers that can be connected in the sub-connection protocol two of the MASTER TX mode of the present invention is four. When the main control unit calls the sub-connection protocol one, the wireless microphone device is in the first special transmitter working mode.

In the receiver working mode, when the main control unit 10 controls the radio frequency unit 60 to call the first connection protocol for operation, at this time, only one external transmitter is connected to the wireless microphone device as the receiver to form the RX MODE mode; when the main control unit 10 controls the radio frequency unit 60 to call the second connection protocol for operation, one to four wireless microphone devices of any number are connected to the wireless microphone device as the receiver to form special receiver working mode. Further, when the wireless microphone device is in the receiver working mode, the time code unit 30 is provided with a first call protocol and a second call protocol; when the main control unit 10 controls the time code unit 30 to call the first calling protocol, the time code unit 30 refers to the first external time code input by the input unit 21 and generates the corresponding local time code, and then the time code unit 30 synchronizes the generated local time code with the first external time code, and can output the local time code; when the main control unit 10 controls the time code unit to call the second calling protocol, the time code unit 30 generates a corresponding local time code with reference to the second external time code, and then the time code unit 30 synchronizes the generated local time code with the second external time code, and can output the local time code. In IEM MODE mode, the main control unit 10 controls the time code unit to call the second call protocol, and the generated local time code is directly output through the output unit 22. In CAMERA HOP mode and RX MODE mode, the main control unit 10 controls the time code unit 30 to call the first call protocol. When the time code unit 30 generates the local time code by referring to the first external time code input by the input unit 21, the time code unit 30 synchronizes the local time code with the first external time code, and the synchronized local time code is output through the output unit 22; or when the time code unit 30 generates the local time code by referring to the second external time code received by the radio frequency unit 60, the time code unit 30 synchronizes the local time code with the second external time code, and the synchronized local time code is output through the output unit 22; or when neither the first time code is inputted nor the second time code is received, the main control unit controls the time code unit to generate the local time code independently.

In MASTER TX mode, the main control unit 10 controls the time code unit 30 to call the first call protocol. When the time code unit 30 generates the local time code by referring to the first external time code input by the input unit 21 and synchronizes the generated local time code with the first external time code, the synchronized local time code is output through the radio frequency unit 60. The time code in MASTER TX mode is input by input unit 21, and the time code unit 30 does not generate the time code. In this working mode, the wireless microphone device can connect multiple receivers, has all the functions of the standard transmitter mode, and can output the time code and support the connection of multiple receivers through the radio frequency unit 60; and can synchronize the time code between the transmitter and the receiver through the time code output by the radio frequency unit 60. In TX+REC mode, the main control unit 10 calls the first call protocol, and the local time code for synchronization obtained by the time code unit 30 is output through the output unit 22. In this working mode, the wireless microphone device is configured as the transmitter, and only one receiver can be connected, which can store audio signals and time codes, and synchronize the time codes (comprising time code input and time code output).

In TC BOX mode, the time code unit 30 does not call the first calling protocol or the second calling protocol, and the time code unit 30 is only configured to generate the time code autonomously, and the time code autonomously generated by the time code unit 30 is directly output by the output unit 22.

In REC ONLY mode, the time code unit 30 does not call the first calling protocol or the second calling protocol, and the time code unit 30 is configured to generate the time code autonomously. The time code autonomously generated by the time code unit 30 is directly output by the output unit 22. At this time, the input unit 21 inputs the first external audio signal, after the first external audio signal is transmitted to the conversion modulation unit 40 for conversion and modulation, the first external audio signal is stored in the storage unit 50 (the output unit and the radio frequency unit do not work).

Each of the above working modes has different functions. Under the corresponding working modes, the wireless microphone device can be configured as the transmitter working mode, the receiver working mode, the time code generator working mode, or the sound recorder working mode, which can be selected by users according to their needs. The wireless microphone device can select to enter the above seven predetermined working modes by calling programming programs written in advance.

The summary is as follows, as shown in FIG. 3:

1. TX+REC Mode

This working mode is the standard transmitter working mode. At this time, the wireless microphone device only supports a connection of a standard receiver (receiver in RX MODE mode). In this working mode, the ADC module in the main control unit 10, input unit 21, output unit 22, conversion modulation unit 40, storage unit 50, time code unit 30, and radio frequency unit 60 all work together. The main control unit 10 controls the ADC module to convert the audio analog signal input by the input unit 21 into the audio digital signal (a signal type of the audio digital signal is IIS signal), and transmit the IIS signal to the radio frequency unit 60. The radio frequency unit 60 converts the received IIS signal into the radio frequency signal and transmits it through the antennas in the radio frequency unit 60, which realizes the standard transmitter function. Meanwhile, this working mode supports the recording function (that is, the audio data stream is stored) and the time code receiving and synchronization function. When recording operation is required, the storage unit 50 stores the audio data stream obtained according to a certain file format in real time. The time code synchronization function is divided into two situations: time code input and time code output; when it is necessary to receive and synchronize external time codes, the time code unit 30 needs to reference and synchronize the time codes input by the input unit 21, which is the time code input situation; when it is necessary to output the time code, the time code unit 30 generates the local time code and outputs it through the output unit 22.

2. RX MODE Mode

This working mode is the standard receiver working mode. At this time, the wireless microphone device only supports the connection of a standard transmitter (transmitter in TX+REC mode). In this working mode, the wireless microphone device does not support the recording function (that is, when the wireless microphone device is in RX MODE mode, the main control unit 10 controls the storage unit 50 does not work). Therefore, at this time, only the main control unit 10, the input unit 21, the output unit 22, the time code unit 30, the DAC module in the conversion modulation unit 40, and the radio frequency unit 60 work together in the wireless microphone device, while the storage unit 50 does not work. The time code function is still consistent with the TX REC mode, which can both output the time code to the external device and synchronize the time code of the external device, and the local time code generated by the time code unit 30 is output through the output unit 22. To realize the standard receiver function, the main control unit 10 controls the radio frequency unit 60 to configure the receiver working mode to receive the radio frequency signal transmitted by the external transmitter, and the radio frequency unit 60 will convert the radio frequency signal into the digital signal (audio digital signal or audio digital signal in the composite digital signal of audio and time code) with the type of IIS signal and transmit it to the DAC module. The DAC module then converts the audio digital signal of the IIS signal type into the audio analog signal for output.

3. MASTER TX Mode

This working mode is the special transmitter working mode (the second special transmitter working mode). At this time, the wireless microphone device can be connected to multiple receivers (the IEM MODE mode or CAMER HOP mode receivers) for operation. In this working mode, in addition to all the functions of the standard transmitter mode, the MASTER TX mode also comprises two special functions. The MASTER TX mode can output time code digital signals through the radio frequency unit 60 and support the connection of multiple receivers. The radio frequency unit 60 outputs the time code to synchronize the time code between the transmitter and the receiver, reducing an impact of data delay during transmission. This working mode can connect up to four receivers, and send audio digital signals to four receivers in IEM MODE mode or CAMERA HOP mode at a same time. In some cases, it can realize a function of one dragging four with high efficiency.

4. IEM MODE Mode

This working mode is the special receiver working mode. In this working mode, four wireless microphone devices (at this time, the four wireless microphone devices are four receivers) can be connected to a transmitter in MASTER TX mode at a same time. This working mode is the same as the standard receiver mode (the RX MODE mode). Both of them can realize the functions of the receiver. Neither of them supports the recording function (neither of them turns on the storage unit 50 for operation). They can also output the time codes to external devices. However, the time codes output by the IEM MODE mode are generated internally when the time code unit 30 of the wireless microphone device turns on for operation. It is not necessary to connect radio frequency unit 60 when outputting time code, while the time code outputted by the RX MODE mode comes from the connected external transmitter. The radio frequency unit 60 must be connected when outputting the time codes, and RX MODE mode supports receiving and synchronizing the external time code, while IEM MODE mode does not support receiving and synchronizing the external time code.

5. CAMERA HOP Mode

This working mode is the special receiver working mode, just like the IEM MODE mode. In this working mode, four wireless microphone units (four receivers) can also be connected to one transmitter in MASTER TX mode at a same time. A working content of the wireless microphone device in this working mode is basically the same as that of the IEM MODE mode. An only difference is that the wireless microphone device can receive and synchronize the time code input by the external device in this working mode, while the IEM MODE mode cannot receive and synchronize the time code input by the external device.

6. TC BOX Mode

In this working mode, the wireless microphone device is neither the transmitter nor the receiver. At this time, the wireless microphone device is only the time code generator. When the wireless microphone device works in this working mode, the conversion modulation unit 40, the storage unit 50, and the radio frequency unit 60 do not work, and only the main control unit 10, the output unit 22, and the time code unit 30 work. When outputting the time code, the time code unit 30 generates the time code independently and outputs it to the external device through the output unit 22.

7. REC ONLY Mode

When configured in this working mode, the wireless microphone device no longer has radio frequency function (radio frequency signal transmission or reception function), but is a recording system with the function of receiving and synchronizing the time code.

In the wireless microphone device of the present invention, as shown in FIG. 1 and FIG. 2, the wireless microphone device further comprises a switching device 70; the input unit 21 and the output unit 22 are electrically connected to the switching device 70; the main control unit 10 is electrically connected to the switching device 70; and the conversion modulation unit 40 is electrically connected to the switching device 70. When a corresponding working mode is selected for a corresponding application scenario, the main control unit 10 configures a corresponding signal transmission channel through the switch device 70. For example, when the wireless microphone device is in the transmitter working mode, a signal transmission channel of the corresponding working mode is formed between the input unit 21, the time code unit 30, and the conversion modulation unit 40 through the switch device 70. Similarly, when the wireless microphone device is in the receiver working mode, the time code generator working mode, or the recording working mode, the switching switch device 70 forms a signal transmission channel of the corresponding working mode between the input unit 21, the output unit 22, the time code unit 30, and the conversion modulation unit 40.

Specifically, the time code unit 30 of the wireless microphone device comprises a real-time clock 31 and a timer 32. The real-time clock 31 is electrically connected to the timer 32, the timer 32 is electrically connected to the main control unit 10, the real-time clock 31 is configured to determine a starting time point generated by the timer 32, and the timer 32 is configured to generate the local time code (independently generate the time code without reference). Alternatively, the timer 32 is configured to generate the local time code by referring to the first external time code input by the input unit 21, and synchronize the generated local time code with the first external time code. Alternatively, the timer 32 is configured to generate the local time code by referring to the second external time code received by the radio frequency unit 60, and synchronize the generated local time code with the second external time code.

Furthermore, the main control unit 10 comprises a circuit substrate 11 and a control module 12. The control module 12 is disposed on the circuit substrate 11. The input unit 21, the output unit 22, the time code unit 30, the conversion modulation unit 40, the storage unit 50, the radio frequency unit 60, and the switching device 70 realize electrical connection by disposing corresponding connection lines on the circuit substrate 11 and designing corresponding types of data interfaces. Specifically, the storage unit 50 comprises a serial audio interface module 51 and a data storage module 52. The serial audio interface module 51 is electrically connected to the control module 12. The data storage module 52 is a mobile memory card. When the output storage unit is configured to store datas, the data storage module 52 is electrically connected to the serial audio interface module 51. The conversion modulation unit 40 and the control module 12 are electrically connected through integrated circuit bus (IIC). The radio frequency unit 60 and the control module 12 are electrically connected through serial peripheral interface (SPI). The conversion modulation unit 40 is electrically connected to the control module 12 through the integrated circuit bus (IIC), and the radio frequency unit 60 is electrically connected to the control module 12 through the serial peripheral interface (SPI). The conversion modulation unit 40 and the radio frequency unit 60, the radio frequency unit 60 and the serial audio interface module 51, and the conversion modulation unit 40 and the serial audio interface module 51 are electrically connected through the serial digital audio bus (IIS).

The control module 12 has a memory function by setting control programs in advance, that is, before the wireless microphone device is powered off, the control module 12 will memorize a current working mode. During the user's power off, the control module 12 will save the current working mode. When a next power on, the control module 12 will actively acquire the working mode saved during the power off process, and this working mode is a default working mode after after power on. For example, when the user is operating and using the MASTER TX working mode in the wireless microphone device before power off, the control module 12 memorizes the working mode during the use, and saves the working mode when the user shuts down the wireless microphone device (that is, the control module 12 always saves and memorizes the working mode after the device powered of), The control module 12 acquires the MASTER TX working mode as the default operating mode after power on As shown in FIG. 1, in a feasible design scheme, the time code unit 30 and the storage unit 50 are both set as modular components independent of the main control unit 10, that is, in this embodiment, components of the wireless microphone device are independent components. For example, the main control unit 10, the input unit 21, the output unit 22, the switch device 70, the time code unit 30, the conversion modulation unit 40, the storage unit 50, and the radio frequency unit 60 are independent components. Each of the components can be prepared independently, and then assembled and connected. Alternatively, as shown in FIG. 2, in another feasible design scheme, the control module 12 of the main control unit 10, the timer 32 of the time code unit 30, and the serial audio interface module 51 of the storage unit 50 are integrated on the circuit substrate 11 to obtain a wireless microphone device with a smaller shape.

The wireless microphone device of the present invention is provided with a display screen (not shown in the figures), which is configured to display usage status datas of the device during usage in real time. The wireless microphone device uses a replaceable lithium ion battery (not shown in the figures) for power supply, and the battery power information is synchronously displayed on the display screen. Each of the components of the wireless microphone device is assembled in a delicate and beautiful shell (not shown in the figures), and function buttons (not shown in the figures) is disposed on the shell. These function buttons are one-to-one opposite to each function key on the circuit substrate 11. The command operations can be easily realized by pressing the function buttons. These function buttons comprise on/off button, selection button, volume button, and so on, Each command operation information is also synchronously displayed on the display screen. Of course, the device ID, communication frequency, etc. can also be set for the device through the function buttons. In addition, the display screen can also adapt a touch screen (when adapting the touch screen, the function buttons can be retained at a same time, or the function buttons can not be set, of course, the switch on button must be retained), so that various command operations can be achieved through the touch screen operation, such as selecting the corresponding working mode, adjusting volume and other command operations. The wireless microphone device of the present invention can also be connected with a gun microphone (gun microphone) (not shown in the figures), through which the local audio signal can be collected, that is, the user can hold the wireless microphone device with the gun microphone to conduct recording and interview, etc.

Of course, in some embodiments, the wireless microphone device is also provided with a comparator (not shown in the figures) or an oscillator (not shown in the figure), which can work together with the main control unit and the time code unit to complete the corresponding functions such as synchronization time code. The above components and their working principles are well known to those in the art, and will not be described in further detail here.

In the wireless microphone device, he wireless microphone device, also comprises an input device (not shown in the figures). Generally, a wireless microphone device needs to be composed of three main parts: an input device, a transmitter (taking the transmitter set by the wireless microphone device of the present invention as an example, the transmitter is assembled and connected to the main components of the main control unit 10, the input unit 21, the output unit 22, the time code unit 30, the conversion modulation unit 40, the storage unit 50, and the radio frequency unit 60) and a receiver (i.e. an external receiver, or the wireless microphone device provided by the present invention). The input device provides the audio signal and the time codes required for transmission under the transmitter working mode, which can be a microphone, such as a shotgun microphone or a lavalier microphone, or a data transmission line connected to the headset port of the wireless microphone device; radio frequency unit 60 is responsible for converting the audio signal into radio frequency signal and transmitting the radio frequency signal through antenna (as shown in FIG. 1 and FIG. 2); the receiver's task is to receive the transmitted radio frequency signal and convert the received signal into the audio signal that can be played.

According to another aspect of the present invention, a method of using a wireless microphone device is provided. The method of using the wireless microphone device is based on an interconnection of at least two aforementioned wireless microphone devices. In a process of connecting and using the at least two wireless microphone devices, the radio frequency unit of one wireless microphone device is configured as a transmitter, and at least one radio frequency unit of the remaining wireless microphone devices is configured as a receiver. When the main control unit 10 of the wireless microphone device configured as the transmitter controls the radio frequency unit 60 to call the first connection protocol, the main control unit 10 of the wireless microphone device configured as the receiver controls the radio frequency unit 60 to call the second connection protocol; or when the main control unit 10 of the wireless microphone device configured as a transmitter controls the radio frequency unit to call the second connection protocol, the main control unit 10 of the wireless microphone device configured as a receiver controls the radio frequency unit 60 to call the first connection protocol. Take an interconnection of two wireless microphone devices as an example. When one of the two wireless microphone devices is configured as the transmitter operating mode, another one of the two wireless microphone devices is configured as the receiver operating mode (when the transmitter is configured as the TX+REC operating mode, the receiver is configured as the IEM MODE operating mode or CAMERA HOP operating mode; when the transmitter is configured as the MASTER TX operating mode, the receiver is configured as the RX MODE mode operating mode), the two wireless microphone devices can form an interconnection and be used. Take an interconnection of five wireless microphone devices as an example, and all five wireless microphone devices need to be used. At this time, configuring one of the five wireless microphone device as the MASTER TX working mode and configuring another four of the fivewireless microphone devices as the RX MODE mode working mode. At this time, one transmitter drags four receivers; or if one of the five wireless microphone devices is configured as the IEM MODE working mode or the CAMERA HOP working mode, the other four of the five wireless microphone devices should be configured as the TX+REC working mode. At this time, one receiver drags four transmitters.

The above is only preferred embodiments of the present invention, and does not limit the present invention. Any modification, equivalent replacement, and improvement made within the spirit and principles of the present invention should be included in the protection scope of the present invention.

What is claimed is:

1. A wireless microphone device, comprising:
an input unit, the input unit configured to receive a first external audio signal or a first external time code;
a time code unit, the time code unit configured to generate a local time code or configured to synchronize a generated local time code with the first external time code;
a conversion modulation unit, the conversion modulation unit configured to convert and modulate the first external audio signal;
a radio frequency unit, the radio frequency unit configured as a transmitter to transmit the first external audio signal converted and modulated by the conversion modulation unit or the local time code generated by the time code unit; or the radio frequency unit configured as a receiver to receive a second external audio signal or a second external time code, wherein the conversion modulation unit is configured to convert and modulate the second external audio signal, and the time code unit is configured to synchronize the generated local time code with the second external time code;
a storage unit configured to store the first external audio signal converted and modulated by the conversion modulation unit or configured to store the second external audio signal converted and modulated by the conversion modulation unit;
an output unit configured to output the local time code generated by the time code unit, or configured to output the first external audio signal converted and modulated by the conversion modulation unit, or configured to output the second external audio signal converted and modulated by the conversion modulation unit, or configured to output a local audio signal stored in the storage unit and converted and modulated by the conversion modulation unit;
a main control unit electrically connected with the input unit, the output unit, the time code unit, the conversion modulation unit, the storage unit, and the radio frequency unit;
wherein the main control unit is configured to control at least two of the input unit, the output unit, the time code unit, the conversion modulation unit, the storage unit, and the radio frequency unit to work together according to received instructions to form a plurality of different working modes.

2. The wireless microphone device according to claim 1, wherein before the wireless microphone device is powered off, the main control unit is configured to acquire and save a current working mode, and when the wireless microphone device is powered on next time, the main control unit is configured to acquire the current working mode before power off as a default working mode after power on.

3. The wireless microphone device according to claim 1, wherein the main control unit controls the input unit to work and input the first external audio signal, and the main control unit controls the time code unit to generate the local time code or synchronize the generated local time code with the first external time code; the main control unit controls the conversion modulation unit to work together with the storage unit, and the radio frequency unit is configured as the transmitter, the radio frequency unit is provided with a first connection protocol and a second connection protocol; when the main control unit controls the radio frequency unit to call the first connection protocol, the wireless microphone device enters a standard transmitter working mode, when the main control unit controls the radio frequency unit to call the second connection protocol, the wireless microphone device enters a special transmitter working mode.

4. The wireless microphone device according to claim 3, wherein the second connection protocol comprises a sub-connection protocol one and a sub-connection protocol two, a number of connectable external receivers set in the sub-connection protocol one is only one, and a number of the connectable external receivers set in the sub-connection protocol two is two to four, when the main control unit calls the sub-connection protocol one, the wireless microphone device is in a first special transmitter working mode, and when the main control unit calls the sub-connection protocol two, the wireless microphone device is in a second special transmitter working mode.

5. The wireless microphone device according to claim 4, wherein when the wireless microphone device enters the second special transmitter working mode, a number of the connectable external receivers of the wireless microphone device is four.

6. The wireless microphone device according to claim 1, wherein the main control unit controls the input unit to work and input only the first external time code or controls the input unit does not work; the main control unit controls the output unit to output the second external audio signal converted and modulated by the conversion modulation unit; the main control unit controls the conversion modulation unit to work together with the time code unit, the radio frequency unit is configured as the receiver, and the radio frequency unit is provided with a first connection protocol and a second connection protocol;

when the main control unit controls the radio frequency unit to call the first connection protocol, the wireless microphone device enters a standard receiver working mode, wherein when the first external time code is input by the input unit, the main control unit controls the time code unit to work and synchronize the generated local time code with the first external time code; when the radio frequency unit receives the second external time code, the main control unit controls the time code unit to work and synchronize the generated local time code with the second external time code; when the input unit does not input the first external time code and the radio frequency unit does not receive the second external time code, the main control unit controls the time code unit to generate the local time code;

when the main control unit controls the radio frequency unit to call the second connection protocol, the wireless microphone device enters a special receiver working mode.

7. The wireless microphone device according to claim 6, wherein the time code unit is provided with a first calling protocol, when the main control unit controls the time code unit to call the first calling protocol, the wireless microphone device enters a special receiver working mode one, and the main control unit controls the time code unit to generate the local time code.

8. The wireless microphone device according to claim 7, wherein the time code unit is further provided with a second calling protocol, when the main control unit controls the time code unit to call the second calling protocol, the wireless microphone device enters a special receiver working mode two, wherein when the input unit is inputted the first external time code, the main control unit controls the time code unit to work and synchronize the generated local time code with the first external time code; when the radio frequency unit receives the second external time code, the main control unit controls the time code unit to work and synchronize the generated local time code with the second external time code; when the input unit is not inputted the first external time code and the radio frequency unit does not receive the second external time code, the main control unit controls the time code unit to generate the local time code.

9. The wireless microphone device according to claim 1, wherein the main control unit is configured to control the time code unit to generate the local time code, and then to control the output unit to output the local time code; the input unit, the conversion modulation unit, the storage unit, and the radio frequency unit do not work, and the wireless microphone device enters a time code generator working mode;

or the main control unit is configured to control the input unit to work and input the first external audio signal, the main control unit is configured to control the conversion modulation unit to convert and modulate the first external audio signal, the main control unit is configured to control the time code unit to generate the local time code, and the main control unit is configured to control the storage unit to store the first external audio signal converted and modulated by the conversion modulation unit, and neither the output unit nor the radio frequency unit operates, and the wireless microphone device enters a sound recorder working mode.

10. A method for using a wireless microphone device, wherein the method for using the wireless microphone device is based on an interconnection of at least two wireless microphone devices;

the wireless microphone device comprising:

an input unit, the input unit configured to receive a first external audio signal or a first external time code;

a time code unit, the time code unit configured to generate a local time code or configured to synchronize a generated local time code with the first external time code;

a conversion modulation unit, the conversion modulation unit configured to convert and modulate the first external audio signal;

a radio frequency unit, the radio frequency unit configured as a transmitter to transmit the first external audio signal converted and modulated by the conversion modulation unit or the local time code generated by the time code unit; or the radio frequency unit configured as a receiver to receive a second external audio signal or a second external time code, wherein the conversion modulation unit is configured to convert and modulate the second external audio signal, and the time code unit is configured to synchronize the generated local time code with the second external time code;
a storage unit configured to store the first external audio signal converted and modulated by the conversion modulation unit or configured to store the second external audio signal converted and modulated by the conversion modulation unit;
an output unit configured to output the local time code generated by the time code unit, or configured to output the first external audio signal converted and modulated by the conversion modulation unit, or configured to output the second external audio signal converted and modulated by the conversion modulation unit, or configured to output a local audio signal stored in the storage unit and converted and modulated by the conversion modulation unit;
a main control unit electrically connected with the input unit, the output unit, the time code unit, the conversion modulation unit, the storage unit, and the radio frequency unit;
wherein the radio frequency unit is provided with a first connection protocol and a second connection protocol;
the radio frequency unit of one of the at least two wireless microphone devices is configured as the transmitter and the radio frequency unit of at least one of the remaining at least two wireless microphone devices is configured as the receiver;
when the main control unit of the wireless microphone device configured as the transmitter controls the radio frequency unit to call the first connection protocol, the main control unit of the wireless microphone device configured as a receiver controls the radio frequency unit to call the second connection protocol; or when the main control unit of the wireless microphone device configured as the transmitter controls the radio frequency unit to call the second connection protocol, the main control unit of the wireless microphone device configured as the receiver controls the radio frequency unit to call the first connection protocol;
after all wireless microphone devices are powered on and startup, the wireless microphone device configured as the transmitter is connected with the corresponding wireless microphone device configured as the receiver.

11. The method for using the wireless microphone device according to claim 10, wherein the main control unit is configured to control at least two of the input unit, the output unit, the time code unit, the conversion modulation unit, the storage unit, and the radio frequency unit to work together according to received instructions to form a plurality of different working modes.

12. The method for using the wireless microphone device according to claim 11, wherein before the wireless microphone device is powered off, the main control unit is configured to acquire and save a current working mode, and when the wireless microphone device is powered on next time, the main control unit is configured to acquire the current working mode before power off as a default working mode after power on.

13. The method for using the wireless microphone device according to claim 10, wherein when the main control unit of the wireless microphone device configured as the transmitter controls the radio frequency unit to call the second connection protocol, the main control unit of the wireless microphone device configured as the receiver controls the radio frequency unit to call the first connection protocol; wherein the second connection protocol comprises a sub-connection protocol one and a sub-connection protocol two, a number of connectable external receivers set in the sub-connection protocol one is only one, and a number of the connectable external receivers set in the sub-connection protocol two is two to four, when the main control unit calls the sub-connection protocol one, the wireless microphone device configured as the receiver is in a first special transmitter working mode, and when the main control unit calls the sub-connection protocol two, the wireless microphone device configured as the transmitter is in a second special transmitter working mode.

14. The method for using the wireless microphone device according to claim 13, wherein when the wireless microphone device configured as the transmitter enters the second special transmitter working mode, a number of the connectable external receivers of the wireless microphone device is 4.

15. The method for using the wireless microphone device according to claim 10, wherein when the main control unit of the wireless microphone device configured as the transmitter controls the radio frequency unit to call the second connection protocol, the main control unit of the wireless microphone device configured as the receiver controls the radio frequency unit to call the first connection protocol; the main control unit controls the input unit to work and input only the first external time code or controls the input unit does not work; the main control unit controls the output unit to output the second external audio signal converted and modulated by the conversion modulation unit; the main control unit controls the conversion modulation unit to work together with the time code unit, and the radio frequency unit is configured as the receiver;
when the main control unit of the wireless microphone controls the radio frequency unit to call the first connection protocol, the wireless microphone device enters a standard receiver working mode, wherein when the first external time code is input by the input unit, the main control unit controls the time code unit to work and synchronize the generated local time code with the first external time code; when the radio frequency unit receives the second external time code, the main control unit controls the time code unit to work and synchronize the generated local time code with the second external time code; when the input unit does not input the first external time code and the radio frequency unit does not receive the second external time code, the main control unit controls the time code unit to generate the local time code;
when the main control unit of the wireless microphone device configured as the transmitter controls the radio frequency unit to call the first connection protocol, the main control unit of the wireless microphone device configured as the receiver controls the radio frequency unit to call the second connection protocol, the wireless microphone device enters a special receiver working mode.

16. The method for using the wireless microphone device according to claim 15, wherein when the main control unit of the wireless microphone device configured as the transmitter controls the radio frequency unit to call the first connection protocol, the main control unit of the wireless microphone device configured as the receiver controls the radio frequency unit to call the second connection protocol, and the time code unit is provided with a first call protocol, when the main control unit controls the time code unit to call the first call protocol, the wireless microphone device enters a special receiver working mode one, and the main control unit controls the time code unit to generate the local time code.

17. The method for using the wireless microphone device according to claim 16, wherein the time code unit is further provided with a second calling protocol, when the main control unit controls the time code unit to call the second calling protocol, one of the at least two of wireless microphone devices enters a special receiver working mode two; wherein when the input unit is inputted the first external time code, the main control unit controls the time code unit to work and synchronize the generated local time code with the first external time code; when the radio frequency unit receives the second external time code, the main control unit controls the time code unit to work and synchronize the generated local time code with the second external time code; when the input unit is not inputted the first external time code and the radio frequency unit does not receive the second external time code, the main control unit controls the time code unit to generate the local time code.

* * * * *